B. W. HARRIS.
METAL CULVERT.
APPLICATION FILED SEPT. 8, 1908.
904,200.
Patented Nov. 17, 1908.
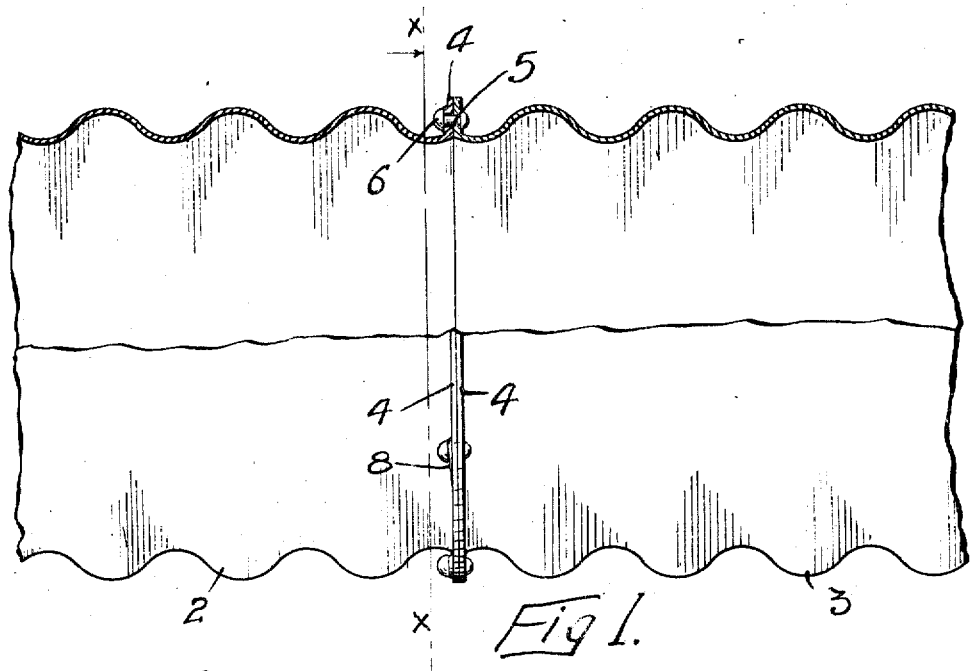
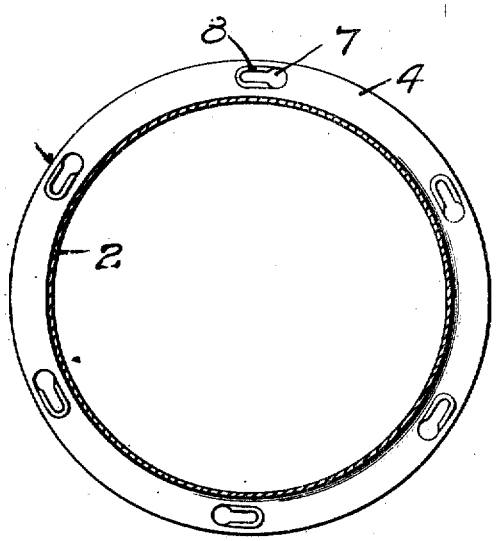
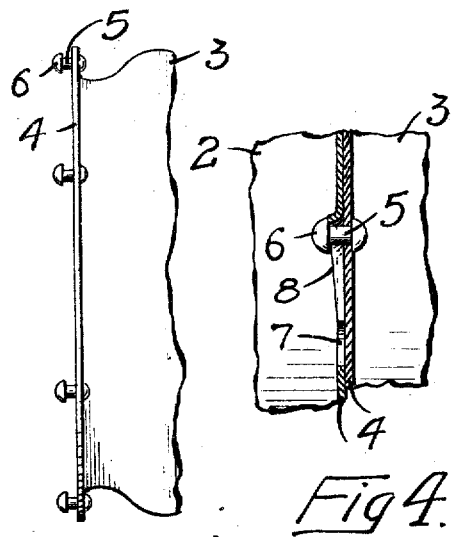
WITNESSES
INVENTOR
BERNHARD W. HARRIS
BY
HIS ATTORNEYS

UNITED STATES PATENT OFFICE.

BERNHARD W. HARRIS, OF MINNEAPOLIS, MINNESOTA.

METAL CULVERT.

No. 904,200.　　　Specification of Letters Patent.　　　Patented Nov. 17, 1908.

Application filed September 8, 1908. Serial No. 451,918.

*To all whom it may concern:*

Be it known that I, BERNHARD W. HARRIS, of Minneapolis, Hennepin county, Minnesota, have invented certain new and useful Improvements in Metal Culverts, of which the following is a specification.

My invention relates to a metallic tubing or pipe adapted for use as a culvert and the primary object of the invention, is to provide a simple, economical method for securing the ends of the culvert pipe sections together, such means embodying but few parts and permitting the assembling of the sections at the work with but little labor and without the use of special tools.

My invention consists generally in various constructions and combinations all as hereinafter described, and particularly pointed out in the claims.

In the accompanying drawings forming part of this specification, Figure 1, is a side view of a portion of a culvert partially in section, to illustrate the manner of securing the ends of the sections together. Fig. 2, is a sectional view on the line x—x of Fig. 1. Fig. 3, is a detail view of the end of one of the sections. Fig. 4, is a detail sectional view illustrating the preferred means employed for securing the sections together.

In the drawing, 2 and 3 represent respectively the abutting sections of the culvert pipe, each having outwardly turned flanges 4 at their ends, and pipe sections being provided with annular corrugations as usual in pipes of this kind. The pipe sections are made of suitable length at the factory and shipped to the work and there assembled and it is desirable to provide a simple inexpensive means for securing the ends of the contiguous sections together. In this case, I prefer to employ the means shown herewith, which consists in providing a series of rivets 5 in one of the flanges 4, having heads 6 which are adapted to pass through key-hole slots 7 provided in the flange of the abutting pipe section. In forming the key-hole slots, I prefer to provide cam surfaces 8 on one side thereof, with which the heads 6 engage, such engagement having the effect when the pipe sections are rotated, of drawing them snugly together. The cam surfaces may be formed in any suitable way, but I prefer to press the edges of the slots outwardly as indicated in Fig. 4, thereby forming the cam surfaces simultaneously with the punching out of the slots. The opening at one end of the key-hole slot, is of sufficient size to allow the passage of the rivet head and the narrower portion of the slot is adapted to receive the shank of the rivet, being too small to permit the passage of the head therethrough. When the rivet heads are inserted into the slots, and the pipe sections rotated, the rivet heads will slide on the cam surfaces, and draw the flanges into close contact with one another. I have shown six of the rivets and a corresponding number of slots, but this number may be varied according to the diameter of the pipe sections. In smaller pipes, the sections may be joined together at the factory, but in the case of large culverts, it will probably be more convenient to assemble the sections at the work, and after uniting them, roll or lower the culvert into the ditch. The culvert sections united in this way, will be firmly and securely held together and the work of uniting them can be easily and expeditiously performed.

I claim as my invention:—

1. A culvert, comprising pipe sections having laterally extending flanges formed on the ends thereof, the flange of one section having a series of rivets mounted therein with shanks and heads projecting from said flange in a direction parallel substantially with the longitudinal axis of the section, and the other flange of the abutting section having a series of key-hole slots which are adapted to receive at one end the heads and shanks of said rivets and said slots having cam surfaces formed on their edges with which the heads of said rivets engage when the pipe sections are rotated, and whereby the said flanges and sections will be drawn snugly together, substantially as described.

2. A culvert, comprising pipe sections having laterally extending flanges formed on the ends thereof, one of said flanges having a series of rivets mounted therein at intervals, said rivets having shanks and heads projecting beyond the plane of said flange, and the flange of the abutting section having a series of slots adapted to receive the heads and shanks of said rivets and means whereby said flanges will be drawn together upon the insertion of said rivets into said slots, and the rotation of a pipe section, substantially as described.

In witness whereof, I have hereunto set my hand this third day of September 1908.

BERNHARD W. HARRIS.

Witnesses:
C. G. HANSON,
W. E. DRESSLER.